J. W. DOUGLAS.
Assignor to W. & B. Douglas
KNAPSACK FIRE-ENGINE.
No. 7,774. Reissued July 3, 1877.
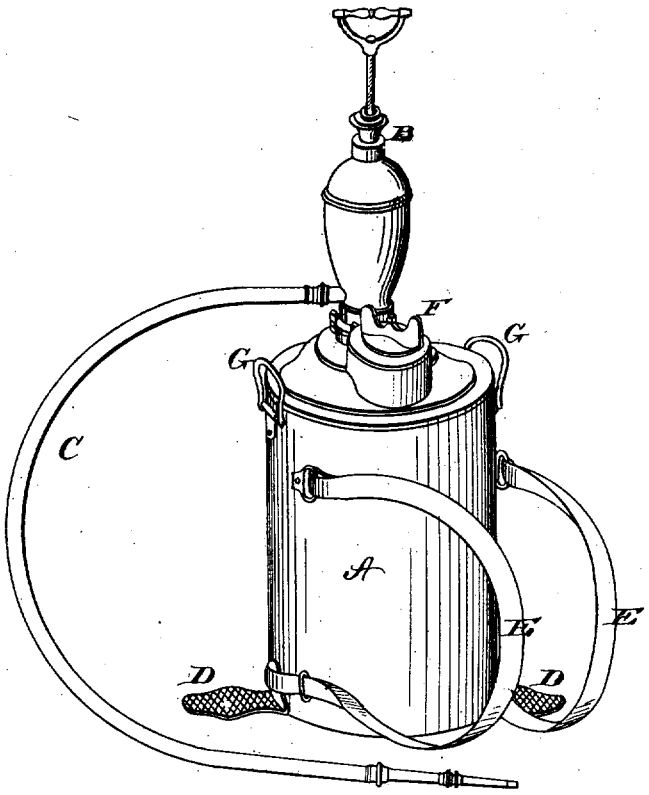
WITNESSES
Franck L. Durand
Frank Gall
INVENTOR
Joseph W. Douglas
By Alexander Mason
ATTORNEYS
N. PETERS, PHOTO-LITHOGRAPHER, WASHINGTON, D. C.

UNITED STATES PATENT OFFICE.

JOSEPH W. DOUGLAS, OF MIDDLETOWN, CONNECTICUT, ASSIGNOR TO W. & B. DOUGLAS.

IMPROVEMENT IN KNAPSACK FIRE-ENGINES.

Specification forming part of Letters Patent No. 93,974, dated August 24, 1869; Reissue No. 7,774, dated July 3, 1877; application filed June 13, 1877.

*To all whom it may concern:*

Be it known that I, JOSEPH W. DOUGLAS, of Middletown, in the county of Middlesex and State of Connecticut, have invented certain new and useful Improvements in Knapsack-Engines; and I do hereby declare that the following is a full, clear, and exact description thereof, reference being had to the accompanying drawing, and to the letters of reference marked thereon, which forms a part of this specification.

The nature of my intention consists in the construction and arrangement of a machine for the purpose of extinguishing fires, which I denominate "The Knapsack-Engine," adapted to be strapped upon the back of an individual, and to carry only a few gallons of water, not enough to prevent a man from carrying the same up a pair of stairs or through the scuttle of a roof, or up a ladder, through a window, where incipient fire may have made a commencement.

It is well known, and often stated by experienced firemen, that no inconsiderable number of fires, when first discovered, might have been extinguished by a pitcher of water applied in the right place.

In my invention there is a combination of a force-pump and a portable reservoir, capable of being used wherever a man can go, especially upon the exposed and dangerous parts of a building, where, but for this machine, effort might be made in vain.

In order to enable others skilled in the art to which my invention appertains to make and use the same, I will now proceed to describe its construction and operation, referring to the annexed drawing, which represents a perspective view of my machine.

A represents the reservoir, made in the form of a cylinder and of any suitable dimensions. At the bottom of the reservoir are outwardly-projecting feet D D to hold the same in place.

B is the force-pump, and C the discharge-pipe. F is the feed-opening for supplying the reservoir with water.

The reservoir is further provided with handles G G for lifting the same, and with belts E E, suitably arranged for strapping the reservoir upon the back.

The pump is the ordinary force-pump, and takes its supply from the bottom part of the reservoir, and is supplied with the usual air-chamber for equalizing the current.

To operate the pump, wherever there is a flat or partially-inclined roof, the reservoir, duly charged, is set upon the roof, and the feet of the operator are placed upon the feet D D. The handle of the pump is grasped by the right hand, and the pipe C by the left, and the nozzle pointed to the burning part of the building, and the force-pump worked vigorously.

The smallness of the size, and the consequent quickness of movement, will enable the instrument to do its work before other and larger instruments can be brought to the place and got into position.

This machine is adapted and designed to be carried on a man's back to every part of a building where a fire may occur. It is always in readiness for operation at a moment's notice.

Having thus fully described my invention, what I claim as new, and desire to secure by Letters Patent, is—

1. The reservoir A, armed with one or more foot-pieces, D, projecting from the reservoir at the bottom, for the purposes herein set forth.

2. With a portable reservoir carrying a pump, the straps E E, for attaching the same to the body, substantially as herein set forth.

3. The reservoir A, armed with foot-pieces D D and belts E E, in combination with the force-pump B and pipe C, arranged and operated substantially in the manner and for the purposes herein set forth.

In testimony that I claim the foregoing I have hereunto set my hand this 14th day of May, 1877.

JOS. W. DOUGLAS.

Witnesses:

GEO. M. SMITH,

JNO. M. DOUGLAS.